United States Patent
Cosby et al.

(10) Patent No.: US 11,029,882 B2
(45) Date of Patent: Jun. 8, 2021

(54) SECURE MULTIPLE SERVER ACCESS TO A NON-VOLATILE STORAGE DEVICE

(71) Applicant: LENOVO Enterprise Solutions (Singapore) PTE. LTD., New Tech Park (SG)

(72) Inventors: David W. Cosby, Raleigh, NC (US); Theodore B. Vojnovich, Raleigh, NC (US); Jonathan R. Hinkle, Raleigh, NC (US); Patrick L. Caporale, Cary, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 0 days.

(21) Appl. No.: 16/370,312

(22) Filed: Mar. 29, 2019

(65) Prior Publication Data
US 2020/0310685 A1    Oct. 1, 2020

(51) Int. Cl.
*G06F 3/06* (2006.01)
*H04L 29/08* (2006.01)

(52) U.S. Cl.
CPC .......... *G06F 3/0659* (2013.01); *G06F 3/0613* (2013.01); *G06F 3/0679* (2013.01); *H04L 67/1051* (2013.01)

(58) Field of Classification Search
CPC .... G06F 3/0613; G06F 3/0659; G06F 3/0679; G06F 3/061; G06F 3/0658; G06F 3/0671; H04L 67/1051
See application file for complete search history.

(56) References Cited

U.S. PATENT DOCUMENTS

| | | | |
|---|---|---|---|
| 2014/0008370 A1* | 1/2014 | Judd | H05K 7/14 220/500 |
| 2014/0195634 A1* | 7/2014 | Kishore | H04L 67/1097 709/213 |
| 2015/0222705 A1* | 8/2015 | Stephens | G06F 3/0611 709/214 |

* cited by examiner

*Primary Examiner* — Larry T Mackall
(74) *Attorney, Agent, or Firm* — Kunzler Bean & Adamson; Bruce R. Needham

(57) ABSTRACT

An apparatus for secure multiple server access to a non-volatile storage device is disclosed. A method and storage device product also perform the functions of the apparatus. An apparatus includes a storage device with three or more ports. Each port includes at least one lane and each port is configured to connect to a different server over the at least one lane of the port. The storage device includes a storage controller in the storage device for each port. Each storage controller controls storage to non-volatile storage of the storage device. The storage device includes a logical namespace assigned to each port. Each logical namespace is assigned to a portion of the non-volatile storage of the storage device. The logical namespace of a first port of the three or more ports is inaccessible to a second port of the three or more ports.

14 Claims, 6 Drawing Sheets

SECURE MULTIPLE SERVER ACCESS TO A NON-VOLATILE STORAGE DEVICE

FIELD

The subject matter disclosed herein relates to storage devices and more particularly relates to multiple server access to a non-volatile storage device.

BACKGROUND

Most industry standard non-volatile storage devices, such as a Non-Volatile Memory Express ("NVMe") protocol device, are designed to provide a two port/two lane ("2P 2X") configuration as simple redundancy. Other non-volatile storage devices deploy a one port/four lane ("1P 4X") configuration where data availability is enhanced by redundancy orchestrated as copying by a higher level software entity. Existing solutions typically deliver a two separate ×2 lanes to the non-volatile storage device. While this provides 2× the performance and N+1 availability, it requires the latency and cost of a switch to provide connectivity to additional entities. The solution also limits the availability model to at best a true N+1 model unless higher level software deploys additional mechanisms (e.g. RAID, multiple copies, etc.). The 2P 2X configuration delivers connectivity to support 2 separate "control nodes" to access the same non-volatile storage device. In net, the two separate paths through two separate storage controllers provide a true N+1 availability model with 2 lanes performance per controller.

Another other common configuration is 1P 4X, where all four lanes are utilized by a single storage controller. This configuration provides a low latency/high bandwidth path from the controller to the non-volatile storage device, but does so at the expense of requiring a singular controller connection, creating a single point of failure. Therefore, the data availability is boosted by elevating the data protection to a higher (solution) level. Specifically, the solution makes N copies of the data across N nodes so that the data availability is sustained through N-M failures. The main challenge with this approach is that efficiency of the storage use is essentially divided by the number of copies. RAID designs somewhat improve the efficiency, but also introduce complexity and delay that may not have mattered with mechanical media, but are significant with NVMe performance.

BRIEF SUMMARY

An apparatus for secure multiple server access to a non-volatile storage device is disclosed. A method and storage device product also perform the functions of the apparatus. An apparatus includes a storage device with three or more ports. Each port includes at least one lane and each port is configured to connect to a different server over the at least one lane of the port. The storage device includes a storage controller in the storage device for each port. Each storage controller controls storage to non-volatile storage of the storage device. The storage device includes a logical namespace assigned to each port. Each logical namespace is assigned to a portion of the non-volatile storage of the storage device. The logical namespace of a first port of the three or more ports is inaccessible to a second port of the three or more ports.

A method for secure multiple server access to a non-volatile storage device includes configuring each port of a storage device with three or more ports. Each port includes at least one lane. Each port is configured to connect to a different server over the at least one lane of the port. The method includes controlling, via a storage controller for each port, storage to non-volatile storage of the storage device, and assigning a logical namespace to each port. Each logical namespace is assigned to a portion of the non-volatile storage of the storage device. The logical namespace of a first port of the three or more ports is inaccessible to a second port of the three or more ports.

A storage device for secure multiple server access to a non-volatile storage device includes three or more ports. Each port includes at least one lane, and each port is configured to connect to a different server over the at least one lane of the port. The storage device includes a storage controller in the storage device for each port. Each storage controller controls storage to non-volatile storage of the storage device. The storage device includes a logical namespace assigned to each port. Each logical namespace is assigned to a portion of the non-volatile storage of the storage device. The logical namespace of a first port of the three or more ports is inaccessible to a second port of the three or more ports. The storage device uses a NVMe protocol, and each lane of a port of the three or more ports has access to the logical namespace assigned to the port.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
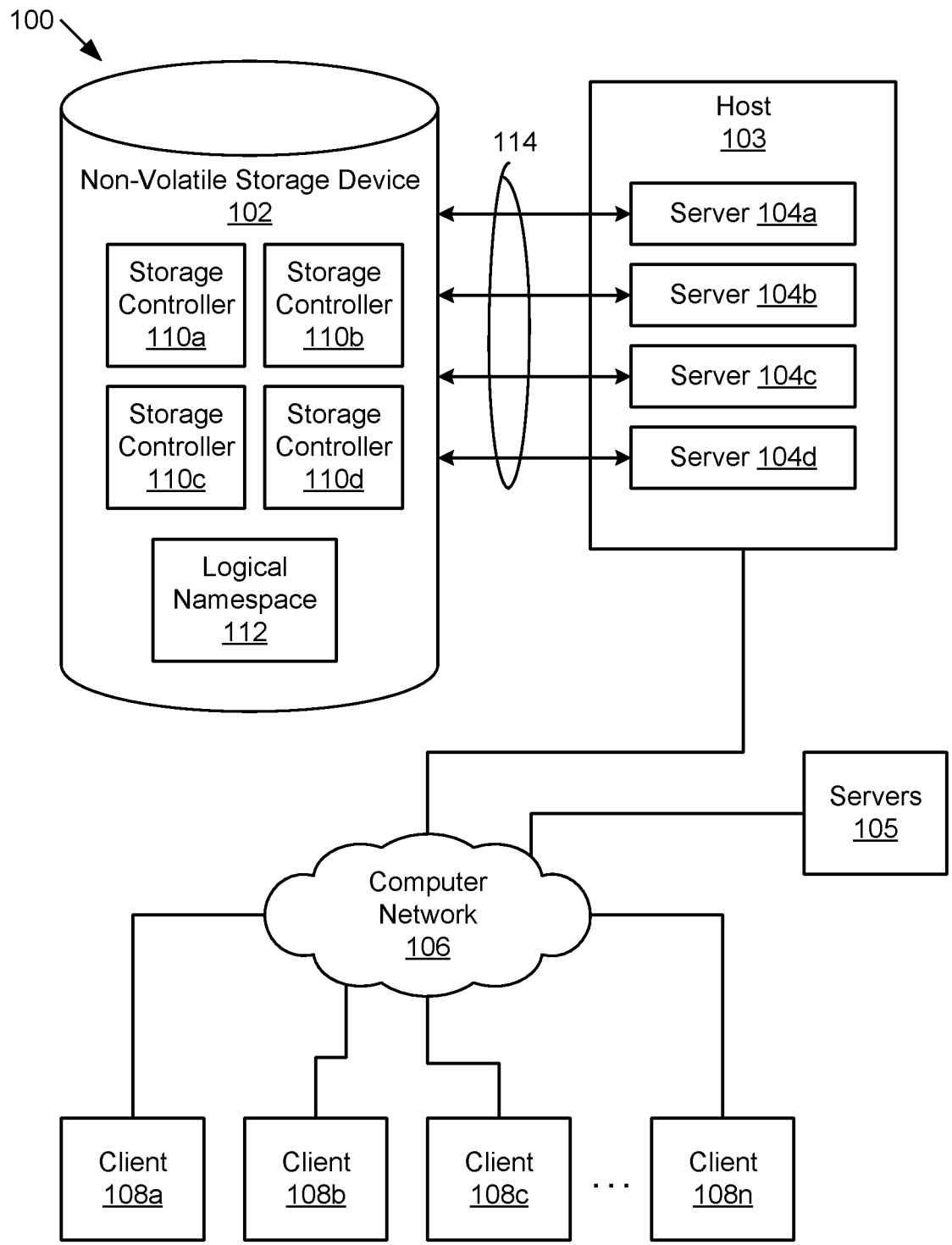
FIG. 1A is a schematic block diagram illustrating one embodiment of a non-volatile storage device connected to a server over four ports where each port has a storage controller.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "controller" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as controllers, in order to more particularly emphasize their implementation independence. For example, a controller may be implemented as a hardware circuit comprising custom VLSI circuits or gate arrays, off-the-shelf semiconductors such as logic chips, transistors, or other discrete components. A controller may also be implemented in programmable hardware devices such as field programmable gate arrays, programmable array logic, programmable logic devices or the like.

Controllers may also be implemented in code and/or software for execution by various types of processors. An identified controller of code may, for instance, comprise one or more physical or logical blocks of executable code which may, for instance, be organized as an object, procedure, or function. Nevertheless, the executables of an identified controller need not be physically located together, but may comprise disparate instructions stored in different locations which, when joined logically together, comprise the controller and achieve the stated purpose for the controller.

Indeed, a controller of code may be a single instruction, or many instructions, and may even be distributed over several different code segments, among different programs, and across several memory devices. Similarly, operational data may be identified and illustrated herein within controllers, and may be embodied in any suitable form and organized within any suitable type of data structure. The operational data may be collected as a single data set, or may be distributed over different locations including over different computer readable storage devices. Where a controller or portions of a controller are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software controllers, user selections, network transactions, database queries, database structures, hardware controllers, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a controller, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for secure multiple server access to a non-volatile storage device is disclosed. A method and storage device product also perform the functions of the apparatus. An apparatus includes a storage device with three or more ports. Each port includes at least one lane and each port is configured to connect to a different server over the at least one lane of the port. The storage device includes a storage controller in the storage device for each port. Each storage controller controls storage to non-volatile storage of the storage device. The storage device includes a logical namespace assigned to each port. Each logical namespace is assigned to a portion of the non-volatile storage of the storage device. The logical namespace of a first port of the three or more ports is inaccessible to a second port of the three or more ports.

In some embodiments, the storage device uses a Non-Volatile Memory Express ("NVMe") protocol. In other embodiments, each lane communicates using a Peripheral Component Interconnect Express ("PCIe") protocol. In other embodiments, each lane communicates using an Ethernet protocol.

In some embodiments, a port of the storage device is configured to communicate with a master controller in a server connected to the port of the storage device. The master controller controls global commands from servers connected to the storage device. A global command includes a command from a server that affects other servers connected to the storage device. In other embodiments, the master controller issues global commands through the server where the master controller is located. In other embodiments, the master controller coordinates execution of a global command with each server connected to the storage device. In other embodiments, the master controller is an active master controller and the apparatus includes a backup master controller on a server different than the server where the active master controller resides and the backup master controller becomes active in response to the active master controller being unavailable. In other embodiments, the master controller communicates with servers connected to the storage device via the storage device. In other embodiments, the master controller communicates with servers connected to the storage device via a computer network different than connections between the servers and the storage device.

In some embodiments, each server connected to a port of the storage device is connected directly to the storage device. In other embodiments, each port has two or more lanes and each lane of a port of the three or more ports has access to the logical namespace assigned to the port. In other embodiments, physical memory addresses of the non-volatile storage of the storage device are segregated between the logical namespaces of the three or more ports.

A method for secure multiple server access to a non-volatile storage device includes configuring each port of a storage device with three or more ports. Each port includes at least one lane. Each port is configured to connect to a different server over the at least one lane of the port. The method includes controlling, via a storage controller for each port, storage to non-volatile storage of the storage device, and assigning a logical namespace to each port. Each logical namespace is assigned to a portion of the non-volatile storage of the storage device. The logical namespace of a first port of the three or more ports is inaccessible to a second port of the three or more ports.

In some embodiments, the storage device uses a Non-Volatile Memory Express ("NVMe") protocol and/or each lane communicates using one of a Peripheral Component Interconnect Express ("PCIe") protocol and an Ethernet protocol. In other embodiments, the method includes communicating over a port of the storage device with a master controller in a server connected to a port of the storage device, the master controller controlling global commands from servers connected to the storage device. A global command is a command from a server that affects other servers connected to the storage device. In other embodiments, the master controller issues global commands through the server where the master controller is located. In other embodiments, the master controller coordinates execution of a global command with each server connected to the storage device. In other embodiments, the master controller communicates with servers connected to the storage device via the storage device. In other embodiments, the master controller communicates with servers connected to the storage device via a computer network different than connections between the servers and the storage device. In other embodiments, physical memory addresses of the non-volatile storage of the storage device are segregated between the logical namespaces of the three or more ports.

A storage device for secure multiple server access to a non-volatile storage device includes three or more ports. Each port includes at least one lane, and each port is configured to connect to a different server over the at least one lane of the port. The storage device includes a storage controller in the storage device for each port. Each storage controller controls storage to non-volatile storage of the storage device. The storage device includes a logical namespace assigned to each port. Each logical namespace is assigned to a portion of the non-volatile storage of the storage device. The logical namespace of a first port of the three or more ports is inaccessible to a second port of the three or more ports. The storage device uses a NVMe protocol, and each lane of a port of the three or more ports has access to the logical namespace assigned to the port.

FIG. 1A is a schematic block diagram illustrating one embodiment 100 of a non-volatile storage device 102 connected to a server 104 over four ports where each port has a storage controller 110a-d. In one embodiment, the non-volatile storage device 102 (e.g. "storage device 102") includes three or more ports. Often, a storage device 102 will include four ports, but other storage devices may include more than four ports. In some embodiments, the storage device 102 uses a Non-Volatile Memory Express ("NVMe") protocol. A common configuration for an NVMe storage device is to have four lanes 114 so that in some embodiments the storage device 102 includes four lanes 114. In other embodiments, the storage device 102 includes more than four lanes 114. For example, the storage device 102 may include eight lanes, 12 lanes, etc.

A lane 114 includes one or more physical wires grouped together to facilitate bi-directional data transfer. For example, where each lane 114 communicates using a Peripheral Component Interconnect Express ("PCIe") protocol, a lane 114 includes two differential signaling pairs with one pair for sending and the other pair for receiving. The storage device 102, in some embodiments, includes pins for each wire of a lane 114. Where there are four wires in a lane 114, the storage device 102 includes, in some embodiments, four pins for the lane 114. In other embodiments, connections for a lane 114 may be in the form of a connector or other device that groups connections in a certain placement. In other embodiments, each lane 114 communicates using an Ethernet protocol. In the embodiment, the lanes 114 are configured for Ethernet communication. Other embodiments include a lane 114 with a different number of wires. One of skill in the art will recognize other forms of a lane 114.

In an embodiment with four lanes 114, each lane 114 of the storage device 102 includes a separate port. In other embodiments, each port of the storage device 102 has at least one lane 114 and each port of the storage device 102 is configured to connect to a different server 104a-d (generically "104") over the at least one lane 114 of the port. In one example, the storage device 102 includes eight lanes 114 and the storage device 102 includes four ports with two lanes per port (not shown) and each port is configured to connect to a different server 104a-d.

In the embodiment 100 of FIG. 1A, each server 104 is connected to a port of the storage device 102 is connected directly to the storage device 102. The servers 104 are connected via lanes 114 without an intervening fabric with switches, routers, etc. A direct connection between the servers 104 and storage device 102 increases security to prevent a user on server (e.g. 104a) from accessing data of another sever (e.g. 104b).

The storage device 102 includes a storage controller 110a-d (generically "110") for each port and each storage controller 110 controls storage to non-volatile storage of the storage device 102. Having a separate storage controller 110 for each port facilitates security so that data storage for a server (e.g. 104a) is inaccessible to the other servers 104b-d. Note that some current embodiments include a storage device with two storage controllers, two ports with two lanes per port and each port (e.g. 2P 2X) is connected to a separate server. However, the 2P 2X configurations are for redundancy and are configured so that if one server fails, a port fails, a storage controller fails, etc. a host controlling the servers can quickly switch to the other server/port/lanes to resume access to data on the storage device. The embodiments disclosed herein isolate the ports and associated lanes 114 and data served by the ports so that the servers 104 are independent of each other and data stored by a server (e.g. 104a) on the storage device 102 is isolated from the other servers 104b-d.

To facilitate isolation of data, the storage device 102 includes a logical namespace 112 assigned to each port. Each logical namespace 112 is assigned to a portion of the non-volatile storage of the storage device 102 where the logical namespace 112 of a first port of the three or more ports is inaccessible to a second port of the three or more ports. Having separate logical namespaces 112 helps to facilitate isolation of data between the devices. Characteristics of the logical namespace 112 are described in more detail below.

The embodiment 100 includes four servers 104a-d. In the embodiment, the servers 104a-d are located in a host 103. The host 103 may be a standalone computer, such as a desktop computer, a mainframe computer, a rack-mounted computer, a baseboard management computer ("BMC") or the like. The servers 104a are separate and may each connect to one or more clients 108a-n and/or servers 105 over a computer network 106. In some embodiments, a server 104, 105 may be partitioned and may include a virtual machine ("VM"). In other embodiments, other virtual machines may access data through a server 104, 105. For example, a server 104 may be configured as a storage controller as part of a storage area network ("SAN"). Other servers 105 may be set up with one or more virtual machines for access by clients 108a-n and may access the servers 104 of the host 103 to access data on the storage device 102. The servers 105, may be part of a cloud computing system, part of a server farm, data center, etc.

In some embodiments, one or more clients (e.g. 108a, 108b) connect over the computer network 106 to a virtual machine on a server 105, which accesses a particular server 104a in the host 103 to access data over a lane 114 while other clients (e.g. 108c, 108d) connect over the computer network 106 to a second virtual machine on a server 105, which accesses another server 104b in the host 103 to access data over a different lane 114. Each virtual machine may be used by a different company, which don't want their data accessible by others. The embodiment depicted in FIG. 1A accommodates isolation of data so that each company with a virtual machine has data security while both companies use the same storage device 102.

The computer network 106 may include local area network ("LAN"), a wide area network ("WAN"), a fiber-optic network, a wireless network, a SAN, the Internet, etc. and may include any combination thereof. The computer network 106 may include switches, routers, servers, and other networking equipment.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Figure 1B:
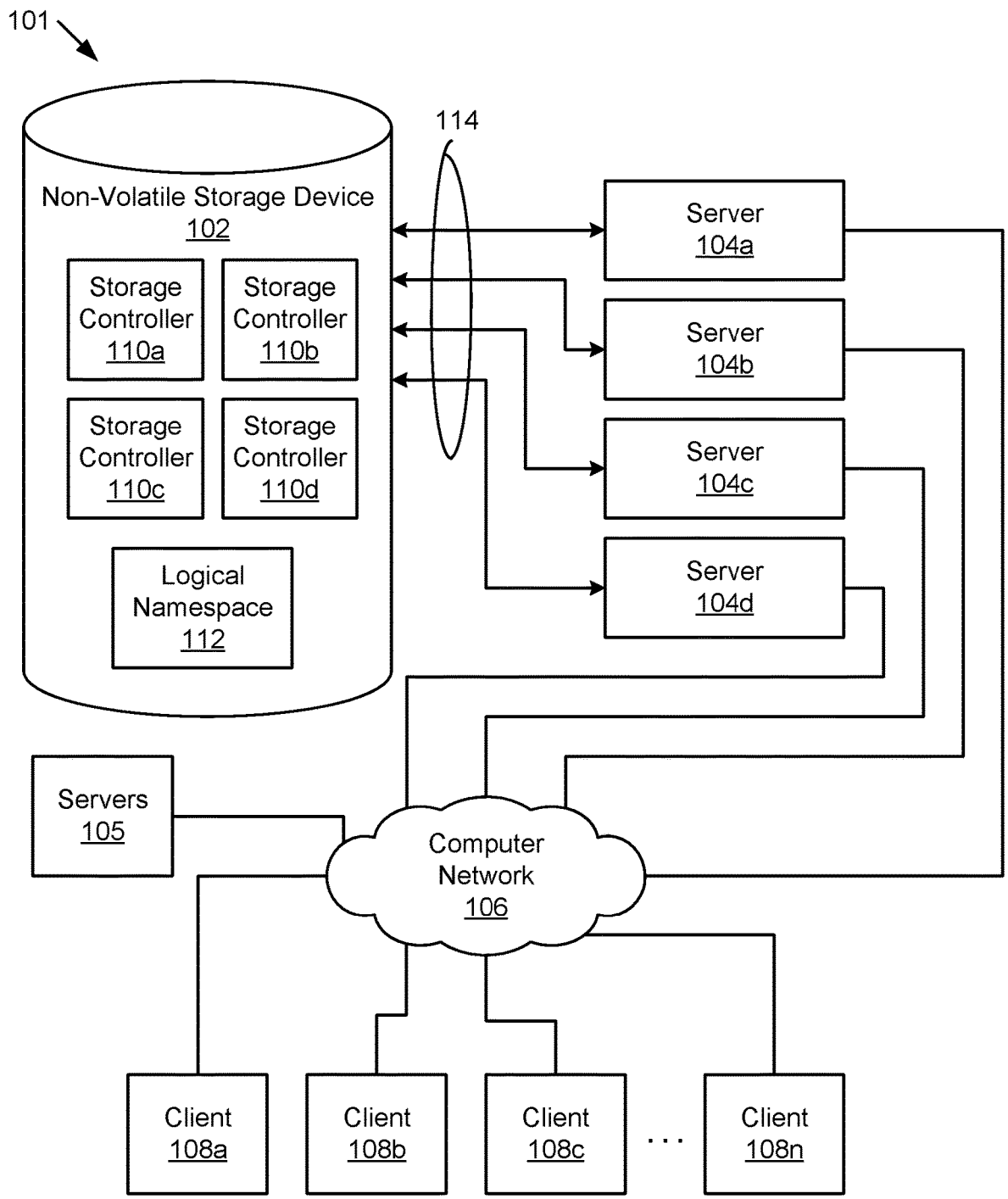
FIG. 1B is a schematic block diagram illustrating one embodiment of a non-volatile storage device connected to four servers over four ports where each port has a storage controller.

FIG. 1B is a schematic block diagram illustrating one embodiment 101 of a non-volatile storage device 102 connected to four servers 104a-d over four ports where each port has a storage controller 110a-d. In the embodiment 101, the non-volatile storage device 102, servers 104a-d, 105, computer network 106, clients 108a-d, storage controllers 110a-d, logical namespace 112 and lanes 114 are substantially similar to those described in relation to the embodiment 100 of FIG. 1A except that the servers 104a-d connected to the storage device 102 are not in a host 103. For example, each server 104a-d may be a stand-alone computer, a rack-mounted computer such as a blade server, a desktop computer, and the like.

Figure 2:
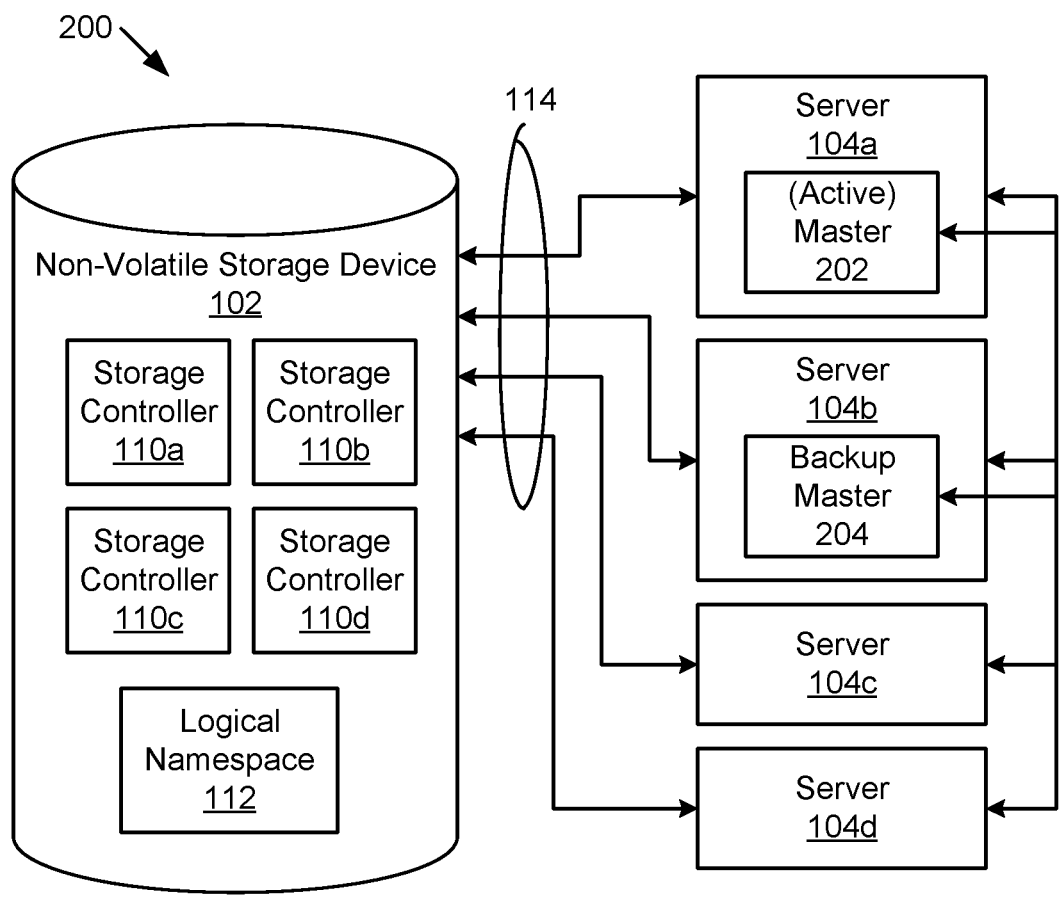
FIG. 2 is a schematic block diagram illustrating one embodiment of a non-volatile storage device connected to four servers over four ports where each port has a storage controller and a server includes a master controller.

FIG. 2 is a schematic block diagram illustrating one embodiment 200 of a non-volatile storage device 102 connected to four servers 104a-d over four ports where each port has a storage controller 110a-d and a server 104a includes a master controller 202. The non-volatile storage device 102, servers 104a-d, storage controllers 110a-d, logical namespace 112 and lanes 114 are substantially similar to those described in relation to the embodiments 100, 101 of FIG. 1A and FIG. 1B. In addition, the embodiment 200 may include other servers 105, a computer network 106, clients 108a-n, etc. as described in the embodiments 100, 101 of FIG. 1A and FIG. 1B, which are not shown for convenience.

In the embodiment 200, the master controller 202 is in a server 104a connected to a port of the storage device 102 and the master controller 202 controls global commands from servers 104a-d connected to the storage device 102. In some embodiments, the master controller 202 coordinates execution of a global command with each server 104 connected to the storage device 102. A global command is defined herein as a command from a server (e.g. 104b) that affects the other servers (104a, 104c, 104d) connected to the storage device 102. For example, a global command may be a reset. When a server (e.g. 104b) wants a reset, the other servers 104a, 104c, 104d would be affected. The master controller 202 coordinates with each server 104 to verify that commands executing on the servers 104 are completed, that pending commands are paused, etc. so that the reset by the server 104b will have minimal effect on the other servers 104a, 104c, 104d. Other commands may also be global commands, such as a power cap command that limits power consumed by the storage device 102, which may slow data transfer to the storage device 102. A global command may be an inbound command, an outbound command, or other command that affects more than the server 104b executing the command.

In some embodiments, the master controller 202 issues global commands through the server (e.g. 104a) where the master controller 202 is located. In other embodiments, the master controller 202 issues global commands through the server (e.g. 104b) where the global command is issued. In some embodiments, the master controller 202 determines which server 104 is qualified to issue a global command. For example, some servers 104 may have physical limitations that prevent issuance of some global commands. The master controller 202, in some embodiments, allows certain global commands to be issued from a server (e.g. 104c) where the global command is requested and the master controller 202 directs another server (e.g. 104a) to issue other global commands, for example, global commands that cannot be issued by the server (e.g. 104c) requesting the global command. One of skill in the art will recognize other ways that a master controller 202 can manage global commands in coordination with the servers 104.

In some embodiments, the master controller 202 is an active master controller 202 and the embodiment 200 includes a backup master controller 204 on a server (e.g. 104b) different than the server 104a where the active master controller 202 resides. The backup master controller 204 becomes active in response to the active master controller 202 being unavailable. For example, the active master controller 202 may crash or have some other problem that prevents the active master controller 202 from functioning properly. The active master controller 202 and the backup master controller 204 communicate such that the backup master controller 204 recognizes when the active master controller 202 is unavailable.

In other embodiments, each server 104 has a master controller and a master selection algorithm chooses which server (e.g. 104a) will be the master. In other embodiments, the active master controller 202 and a backup master controller 204 are pre-selected. One of skill in the art will recognize other ways to choose which server 104 will be a master or will contain a master controller 202, 204.

In some embodiments, the master controller 202 communicates with servers 104 connected to the storage device 102 via the storage device 102. In the embodiment, the master controller 202 communicates over the lanes 114 through the storage device 102. In other embodiments, the master controller 202 communicates with servers 104 connected to the storage device 102 via a computer network (e.g. 106) different than connections between the servers 104 and the storage device 102. In some embodiments, the master controller 202 communicates over a same computer network 106 that the servers 104 communicate with clients 108a-n, servers 105, etc. In other embodiments, the master controller 202 communicates over a different network, such as a dedicated channel, an out-of-band network, a side-band network, etc. using an Intelligent Platform Management Interface ("IPMI") or other protocol. The network may be an I2C network, a Power Management Bus ("PMBus"), a System Management Bus ("SMBus"), etc.

Figure 3:
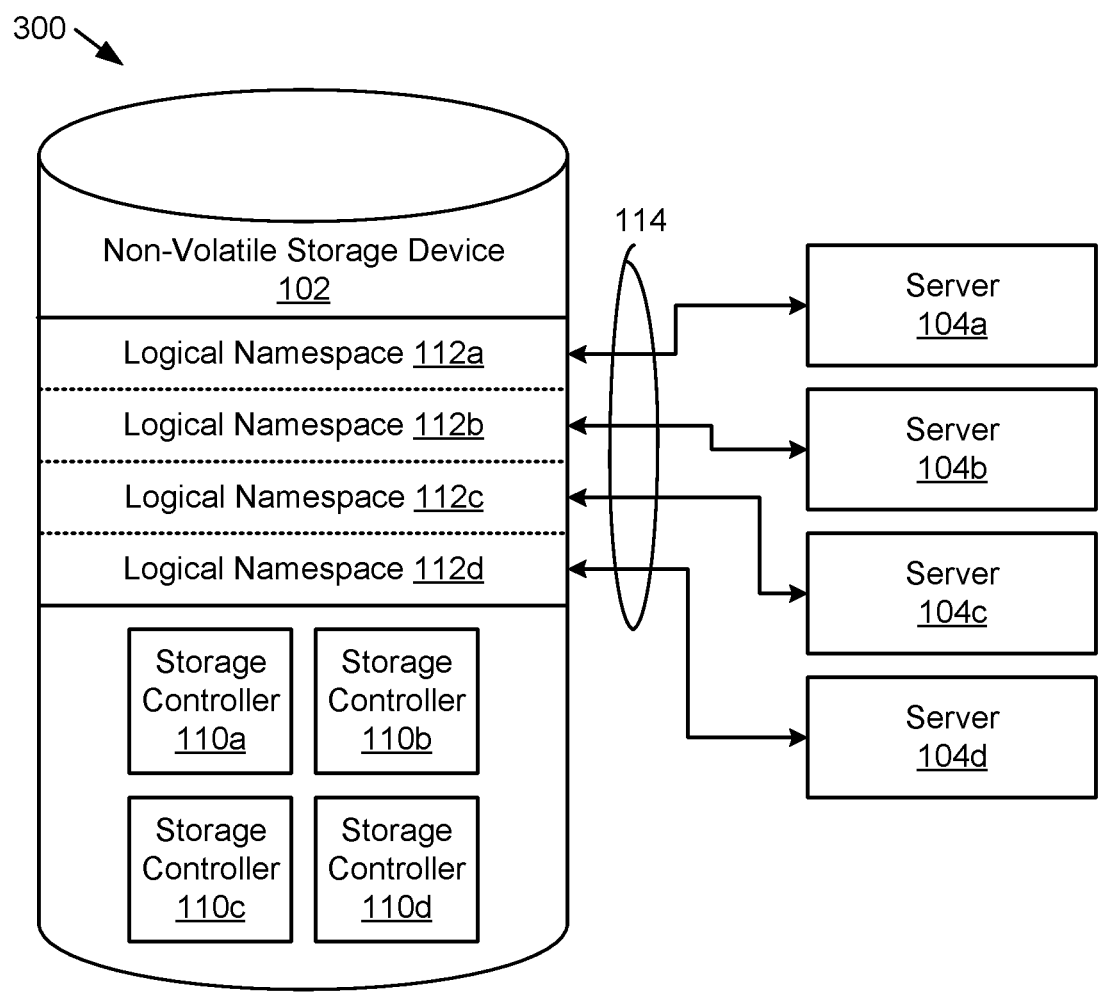
FIG. 3 is a schematic block diagram illustrating one embodiment of a non-volatile storage device connected to four servers over four ports where each port has a storage controller and each port has a separate logical namespace.

FIG. 3 is a schematic block diagram illustrating one embodiment 300 of a non-volatile storage device 102 connected to four servers 104a-d over four ports where each port has a storage controller 110a-d and each port has a separate logical namespace 112a-d. The non-volatile storage device 102, servers 104a-d, storage controllers 110a-d, logical namespaces 112a-d and lanes 114 are substantially similar to those described in relation to the embodiments 100, 101, 200 of FIGS. 1A, 1B and 2. In addition, the embodiment 300 may include other servers 105, a computer network 106, clients 108a-n, etc. as described in the embodiments 100, 101 of FIG. 1A and FIG. 1B, which are again not shown for convenience.

In computing, a namespace or logical namespace is a set of symbols that are used to organize objects of various kinds to that these objects may be referred to by a particular name. In the case of the storage device 102, logical namespaces 112a-d are logical names that map to assigned physical addresses in the storage device 102. The logical namespaces 112a-d help to prevent a user on a server (e.g. 104a) from accessing data of another server (e.g. 104b) because the user typically does not have the logical namespace 112b of the other server 104b. A logical namespace 112 typically has enough characters, bits, etc. to be difficult for a user that does not have an exact logical namespace 112a to guess or derive the logical namespace 112a. By contrast, a physical address range typically has a smaller number of possibilities and is easier to derive. For example, the ports are each assigned to a group of addresses of a particular form, such as 0x1000, 0x2000, 0x3000 and 0x4000, a user accessing a server assigned to a data range corresponding to 0x1000 may surmise addresses of a neighboring range and may search for data in a data range corresponding to 0x2000.

In one embodiment, each logical namespace 112a-d maps to physical addresses controlled by the various storage controllers 110a-d where data of the logical namespaces 112a-d is based on a data management plan that mixes the data. In another embodiment, each logical namespace 112a-d maps to physical addresses controlled by the various storage controllers 110a-d where data of the logical namespaces 112a-d are each assigned to a fixed address range. In some embodiments, the logical namespaces 112a-d are each assigned a particular amount of space of a total amount of available space on the storage device 102. For example, if the storage device has a total of 400 gigabytes ("GB") of available storage space, each logical namespace 112a-d may be assigned 100 GB. In other embodiments, each logical namespace 112a-d may be oversubscribed counting on some servers 104 not using all of the available space and the storage controllers 110a-d may then reallocate data storage limits as necessary. One of skill in the art will recognize ways that the storage controllers 110a-d manage storage space of the storage device 102.

Advantageously, creating a port for each lane 114 of a storage device 102 and then having a single server 104 (e.g. 104a) connected to a lane 114, having a logical namespace (e.g. 112a) for the port and a separate storage controller (e.g. 110a) for the port provides a way to increase the number of servers 104 that can securely connect to the storage device 102. Prior art solutions with multiple servers connected to ports of a storage device 102 are not configured to maintain security between servers and data accessed by the servers, but are instead configured for redundancy. While the servers 104 are separate as depicted in FIGS. 1A, 1B, 2 and 3, in some embodiments, a single server may connect to two lanes, but may be then separated from other servers connected to the storage device 102. In other embodiments, the embodiments 100, 101, 200, 300 disclosed herein provide a mechanism for data security, but may be configured to be used for redundancy. For example, servers 104 may share a common logical namespace 112 or may each store the same data so if a server (e.g. 104a) fails, another server (e.g. 104b) may provide access to the data that was available to the failed server 104a. The embodiments 100, 101, 200, 300 described herein offer flexibility, an increased number of server connections, and data security between the servers 104.

Figure 4:
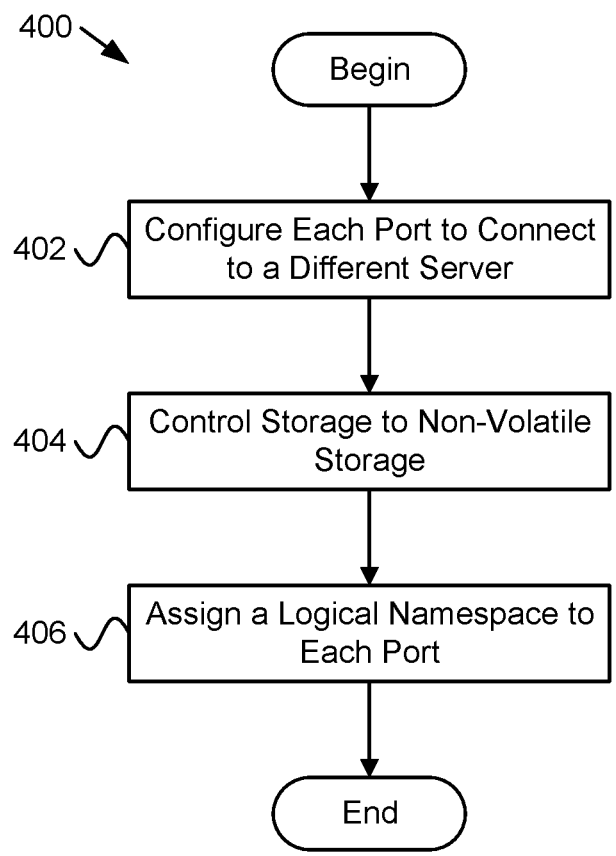
FIG. 4 is a schematic flow chart diagram illustrating one embodiment of a method for configuring a non-volatile storage device connected to multiple servers where each server is connected over a separate port and the storage device includes four storage controllers.

FIG. 4 is a schematic flow chart diagram illustrating one embodiment of a method 400 for configuring a non-volatile storage device 102 connected to multiple servers 104 where each server 104 is connected over a separate port and the storage device 102 includes four storage controllers 110a-d. The method 400 begins and configures 402 each port of a storage device 102 with three or more ports. Each port includes at least one lane and each port is configured to connect to a different server 104 over the at least one lane of the port. The method 400 controls 404, via a storage controller 110 for each port, storage to non-volatile storage of the storage device 102. The method 400 assigns 406 a logical namespace to each port, and the method 400 ends. Each logical namespace is assigned to a portion of the non-volatile storage of the storage device 102 where the logical namespace of a first port of the three or more ports is inaccessible to a second port of the three or more ports. In some embodiments, the storage controllers 110 and/or servers 104 configure 402 each port, control 404 storage on the storage device 102, and assign 406 logical namespaces.

Figure 5:
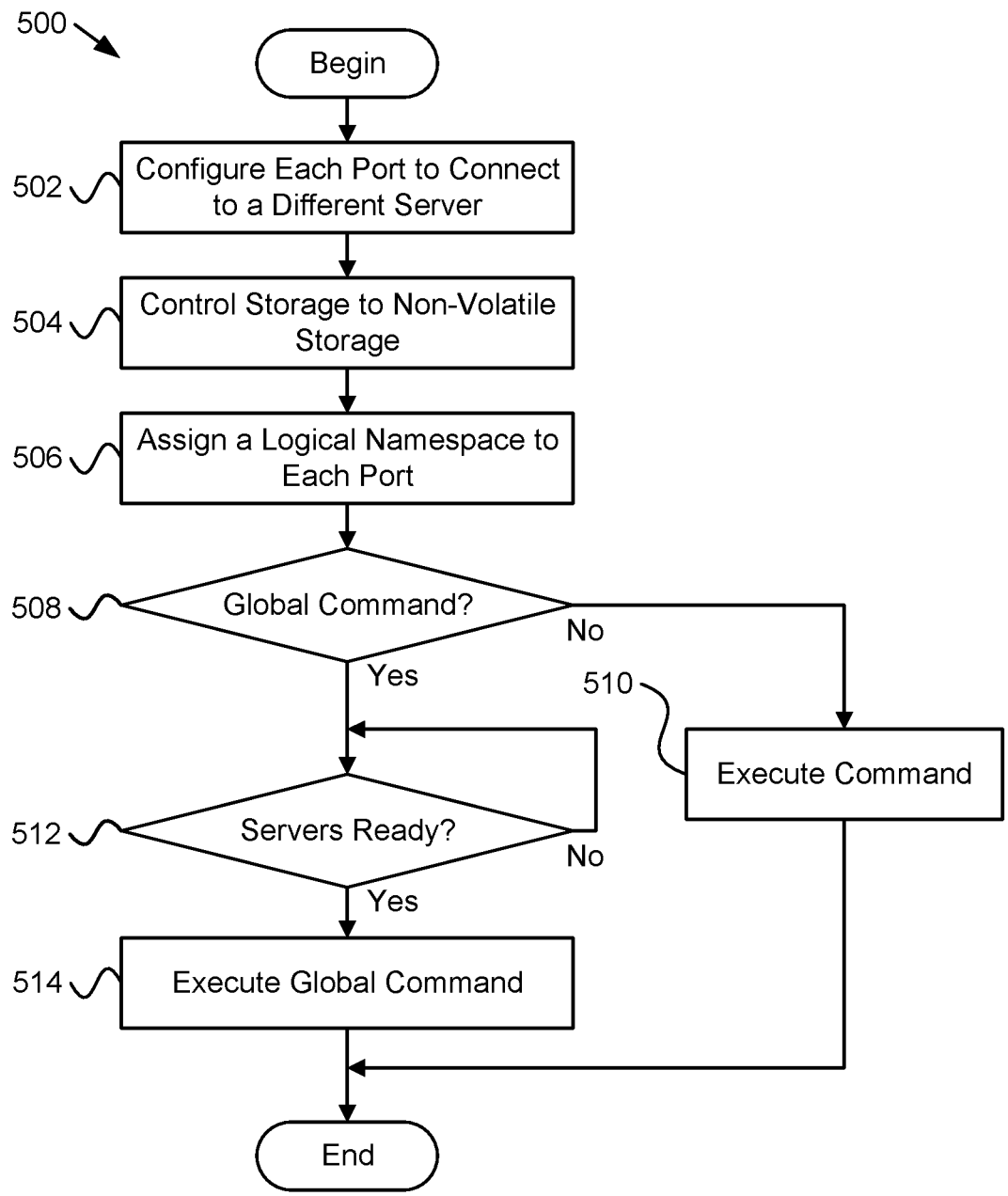
FIG. 5 is a schematic flow chart diagram illustrating one embodiment of a method for configuring a non-volatile storage device connected to multiple servers where each server is connected over a separate port and the storage device includes four storage controllers and for executing a global command.

FIG. 5 is a schematic flow chart diagram illustrating one embodiment of a method 500 for configuring a non-volatile storage device 102 connected to multiple servers 104 where each server 104 is connected over a separate port and the storage device 102 includes four storage controllers 110a-d, and for executing a global command. The method 500 begins and configures 502 each port of a storage device 102 with three or more ports. Each port includes at least one lane and each port is configured to connect to a different server 104 over the at least one lane of the port. The method 500 controls 504, via a storage controller 110 for each port, storage to non-volatile storage of the storage device 102.

The method 500 assigns 506 a logical namespace to each port. Each logical namespace is assigned to a portion of the non-volatile storage of the storage device 102 where the logical namespace of a first port of the three or more ports is inaccessible to a second port of the three or more ports.

The method 500 determines 508 if a command requested by a server (e.g. 104*b*) is a global command. The global command is a command from a server (e.g. 104*b*) that affects other servers (e.g. 104*a*, 104*c*, 104*d*) connected to the storage device 102. In some embodiments, a master controller 202 in a server (e.g. 104*a*) connected to a port of the storage device 102 controls global commands from servers 104 connected to the storage device 102. If the method 500 determines 508, via the master controller 202, that the command is not a global command, the method 500 allows the server 104*b* to execute 510 the command, and the method 500 ends.

If the method 500 determines 508, via the master controller 202, that the command is a global command, the method 500 determines 512 if the servers 104 are ready for the global command to be executed. If the method 500 determines 508 that the servers 104 are not ready for the global command to be executed, the method 500 returns and continues to determine 508 if the servers 104 are ready for execution of the global command. If the method 500 determines 508 that the servers 104 are ready for the global command to be executed, the method 500 executes 514 the global command, and the method 500 ends. In some embodiments, the storage controllers 110 and/or servers 104 configure 502 each port, control 504 storage on the storage device 102, and assign 506 logical namespaces.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a solid-state storage device with three or more ports, the solid-state storage device comprising solid-state non-volatile memory in a housing and the solid-state storage device uses a Non-Volatile Memory Express ("NVME") protocol, each port comprising a single lane, each lane communicating using a Peripheral Component Interconnect Express ("PCIe") protocol, each port configured to connect directly to a different server of a plurality of servers over the lane of the port free of an intervening network communication fabric;
   a plurality of storage controllers in the housing of the solid-state storage device, each storage controller of the plurality of storage controllers associated with a different port of the three or more ports, the plurality of storage controllers in a housing of the solid-state storage device, each storage controller controlling storage to non-volatile storage within the housing of the solid-state storage device; and
   a logical namespace assigned to each port and associated lane, each logical namespace assigned to a portion of the non-volatile storage of the solid-state storage device in the housing, wherein the logical namespace of a first port of the three or more ports and the associated lane of the first port is inaccessible to a second port of the three or more ports and the associated lane of the second port.

2. The apparatus of claim 1, wherein a port of the solid-state storage device is configured to communicate with a master controller in a server connected to the port of the solid-state storage device, wherein the master controller controls global commands from servers connected to the solid-state storage device, a global command comprising a command from a server that affects other servers connected to the solid-state storage device.

3. The apparatus of claim 2, wherein the master controller issues global commands through the server where the master controller is located.

4. The apparatus of claim 2, wherein the master controller coordinates execution of a global command with each server connected to the solid-state storage device.

5. The apparatus of claim 2, wherein the master controller is an active master controller and further comprising a backup master controller on a server different than the server where the active master controller resides and wherein the backup master controller becomes active in response to the active master controller being unavailable.

6. The apparatus of claim 2, wherein the master controller communicates with servers connected to the solid-state storage device via the solid-state storage device.

7. The apparatus of claim 2, wherein the master controller communicates with servers connected to the solid-state storage device via a computer network different than connections between the servers and the solid-state storage device.

8. The apparatus of claim 1, wherein physical memory addresses of the non-volatile storage of the solid-state storage device are segregated between the logical namespaces of the three or more ports.

9. A method comprising:
   configuring each port of a solid-state storage device with three or more ports, the solid-state storage device comprising solid-state non-volatile memory in a housing and the solid-state storage device uses a Non-Volatile Memory Express ("NVME") protocol, each port comprising a single lane, wherein each lane communicates using a Peripheral Component Interconnect Express ("PCIe") protocol, wherein each port configured to connect directly to a different server of a plurality of servers over the lane of the port free of an intervening network communication fabric;
   controlling, via a plurality of storage controllers in the housing of the solid-state storage device, that are each associated with a different port of the three or more ports, storage to non-volatile storage of the solid-state storage device, wherein the plurality of storage controllers and the non-volatile storage are disposed within a same housing of the solid-state storage device; and
   assigning a logical namespace to each port and associated lane, each logical namespace assigned to a portion of the non-volatile storage of the solid-state storage device, wherein the logical namespace of a first port of the three or more ports and the associated lane of the first port is inaccessible to a second port of the three or more ports and the associated lane of the second port.

10. The method of claim 9, further comprising communicating over a port of the solid-state storage device with a master controller in a server connected to a port of the solid-state storage device, the master controller controlling global commands from servers connected to the solid-state storage device, a global command comprising a command from a server that affects other servers connected to the solid-state storage device.

11. The method of claim 10, wherein one or more of:
the master controller issues global commands through the server where the master controller is located; and
the master controller coordinates execution of a global command with each server connected to the solid-state storage device.

12. The method of claim 10, wherein one of:
wherein the master controller communicates with servers connected to the solid-state storage device via the solid-state storage device; and
wherein the master controller communicates with servers connected to the solid-state storage device via a computer network different than connections between the servers and the solid-state storage device.

13. The method of claim 9, wherein physical memory addresses of the non-volatile storage of the solid-state storage device are segregated between the logical namespaces of the three or more ports.

14. A solid-state storage device comprising:
solid-state non-volatile storage in a housing of the solid-state storage device;
three or more ports at an interface to the housing, each port comprising a single lane, each lane communicating using a Peripheral Component Interconnect Express ("PCIe") protocol, each port configured to connect directly to a different server of a plurality of servers over the lane of the port free of an intervening network communication fabric;
a plurality of storage controllers in the housing of the solid-state storage device, each storage controller of the plurality of storage controllers associated with a different port of the three or more ports, the plurality of storage controllers in a housing of the solid-state storage device, each storage controller controlling storage to non-volatile storage within the housing of the solid-state storage device; and
a logical namespace assigned to each port and associated lane, each logical namespace assigned to a portion of the non-volatile storage of the solid-state storage device in the housing, wherein the logical namespace of a first port of the three or more ports and the associated lane of the first port is inaccessible to a second port of the three or more ports and the associated lane of the second port, and
wherein the solid-state storage device uses a Non-Volatile Memory Express ("NVMe") protocol.

* * * * *